Figure 1:
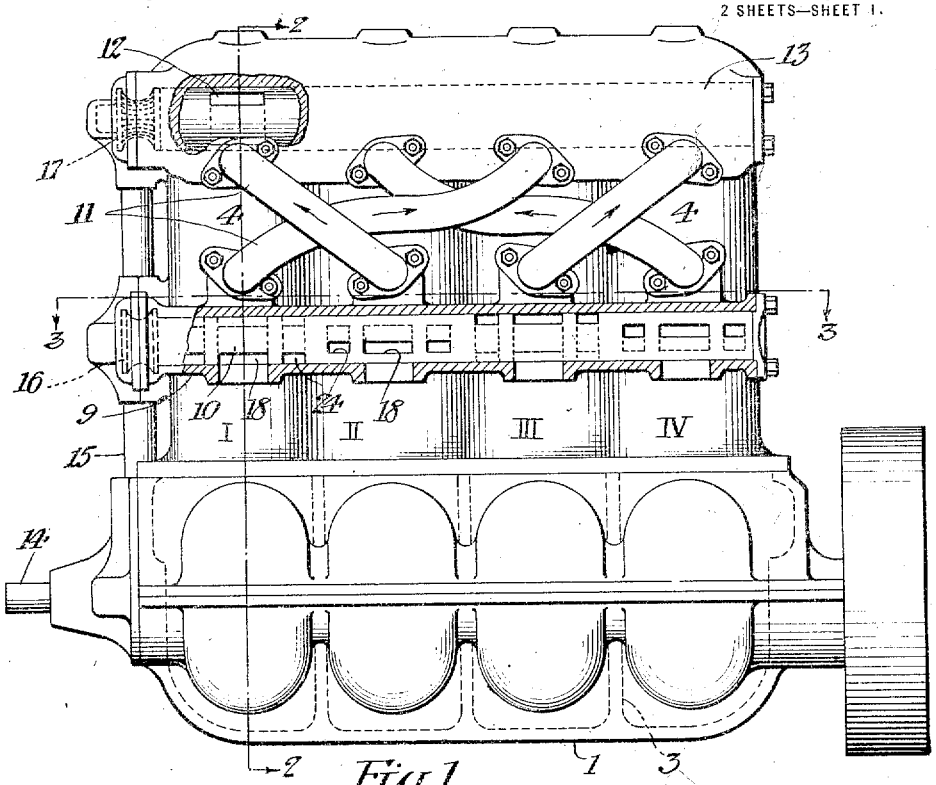

R. T. KINGSFORD.

INTERNAL COMBUSTION MOTOR.

APPLICATION FILED MAR. 29, 1910.

Reissued July 4, 1916.

14,163.

2 SHEETS—SHEET 1.

Witness:-

Ellis H. Jones

Inventor

Russell T. Kingsford.

by his Attorney.

C. W. Fairbank

R. T. KINGSFORD.

INTERNAL COMBUSTION MOTOR.

APPLICATION FILED MAR. 29, 1916.

Reissued July 4, 1916.

14,163.

2 SHEETS—SHEET 2.

Witness:-
Ethan H. Stone

Inventor
Russell T. Kingsford
by his Attorney
C. M. Fairbank

UNITED STATES PATENT OFFICE.

RUSSELL T. KINGSFORD, OF PLAINFIELD, NEW JERSEY.

INTERNAL-COMBUSTION MOTOR.

14,163. Specification of Reissued Letters Patent. Reissued July 4, 1916.

Original No. 1,092,578, dated April 7, 1914, Serial No. 733,607. Application for reissue filed March 29, 1916. Serial No. 87,629.

*To all whom it may concern:*

Be it known that I, RUSSELL T. KINGSFORD, a citizen of the United States, and a resident of Plainfield, county of Union, and State of New Jersey, have invented a new and useful Improvement in Internal-Combustion Motors, of which the following is a specification, the principle of the invention being herein explained and the best mode in which I have contemplated applying that principle, so as to distinguish it from other inventions.

The present invention, relating as indicated to internal combustion motors or engines, has regard more particularly to internal combustion engines of the so-called two-cycle type having three or more cylinders and means for delivering scavenging air to the combustion chambers after the opening of the exhaust and before the admission of the fuel charge.

Two-cycle engines as a class have been relatively wasteful of fuel, have not been able to run at variable speeds as well as four-cycle engines, and have been very liable, especially at low speeds, to "back fire," *i. e.*, ignite the incoming gas by the exhausting charge. These troubles have been largely due to a certain amount of mixing of the new unburnt charge with the exhausting gases, this being unavoidable in the older types of two-cycle engines. I am aware that it has been proposed to improve these engines by using air for scavenging, thereby securing a greater fuel economy, but this has also resulted in a reduction of the power and speed of the engine due to the extra time required for such scavenging before fuel admission; and the shorter time available for the entrance of the new charge makes necessary a higher charging pressure and velocity, resulting in considerable admixture of the charge with the air in the cylinder, even when from throttling the volume of the charge is small.

Without fairly complete separation of the air and charge, the engine cannot be throttled to run at low speeds; since a small charge of normal richness becomes, when mixed with the air in the cylinder, too lean for firing, and a small charge of excessively rich mixture, when so mixed, becomes a full charge of normal mixture, developing full power and speed. Furthermore, where these engines employing air scavenging have been made with a number of cylinders, the various pumping chambers generally discharge into a common receiver or distributer from which the charge is admitted to the various combustion chambers at a substantially uniform pressure throughout the admission period. In air scavenged engines, it is desirable to continue the charging period after the closing of the exhaust port, because of the time taken for scavenging; but if this is done, where receiver charging is used, the increasing compression pressure in the combustion chamber after the exhaust is closed, forces back into the receiver part of the charge which had previously entered the combustion chamber; thus increasing the admixture of the charge with the scavenging air remaining in the cylinder, not only because of this reversal of flow, but also because of the higher charging velocity due to the shorter effective charging period.

My invention is an improvement on that type of engine construction in which there are employed three or more units each including a combustion chamber, a fuel displacing or pumping chamber and an air compressing chamber. In a preferred form of said type, each unit has the upper part of the cylinder or portion of its bore having the smaller diameter, constituting the combustion chamber, while one of the pumping chambers is annular and is formed between the lower portion of the piston that fits in the larger bore of the cylinder and the offset or shoulder between such smaller bore and the larger bore. The crank case is properly closed and preferably constitutes the other pumping chamber. Thus, in each unit, the movement of the piston in one direction draws in a fuel charge and compresses for delivery an air scavenging charge while the movement of the piston in the opposite direction takes in air and delivers fuel charge. Preferably, the annular chamber is used as the fuel displacing or pumping chamber and the crank case is used for the air compressing or pumping chamber.

As the most important feature of my invention, I provide passages and valves so designed and arranged that while the piston of one unit is at the lower end of its power stroke and after the exhaust port of the combustion chamber of that unit has opened, the passage from the crank case of that unit is opened to the combustion chamber to admit scavenging air. This air, at the time of its admission to the combustion chamber, being at approximately the height of its compression, will perform its function very rapidly. Preferably, when the piston starts on its return stroke and before the exhaust port is closed, and at the time, or slightly before, the air inlet port is closed, a passage is opened to connect the combustion chamber with the fuel pumping chamber of another unit in which the piston is making its fuel delivery stroke. The fuel pumping piston of the last mentioned unit continues its delivery stroke while the piston of the first mentioned unit is making its compression stroke in the combustion chamber. As the pumping piston is never more than one-third of a crank shaft revolution ahead of the working piston of the unit to which the charge is being delivered, the delivery of charge to the combustion chamber will continue for some time and the passage between the two chambers may remain open until or at approximately the time the pumping piston completes its delivery stroke, at which time the passage may be closed. Thus, none of the passages serve as reservoirs for the storage of either compressed air or compressed fuel charge; the air charge is under its highest compression in the air compression chamber at the time the passage is opened, and it is released to rapidly perform the scavenging action and the fuel charge continues to be bodily transferred to the combustion chamber while the piston in the combustion chamber is making a part of its combustion stroke. The fuel charge is not compressed to any considerable extent but is transferred to the combustion chamber more by the displacing action of the pump in the fuel pumping chamber than by the compression to which the charge is subjected. Valves are employed in connection with the foregoing, but these are of the rotary type and are used in handling the cool gases only, viz., the incoming charge and the scavenging air, the exhaust being controlled by the movement of the piston.

By means of the foregoing construction I am enabled to greatly increase the period of time during which the charge enters and to correspondingly reduce the time during which the charging and exhausting periods overlap, thereby giving perfect scavenging and ample time for all the events of the cycle without wasting the fresh charge. By the arrangement and type of valves which I employ, I furthermore get rid of all valve trouble and noise. I thus attain the desirable objects in a two-cycle internal combustion engine of greater fuel economy, speed flexibility, quietness, power and reliability.

To the accomplishment of the foregoing and related objects, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 7:
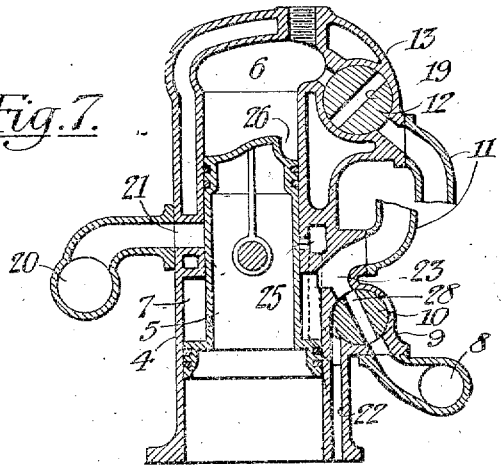
Figure 8:
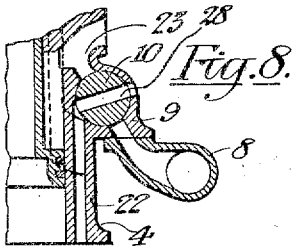
Figure 2:
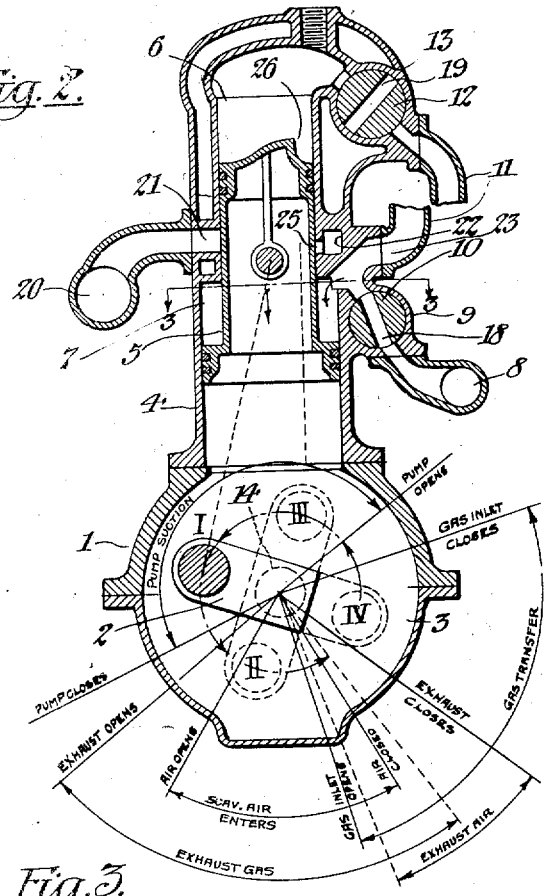
Figure 4:
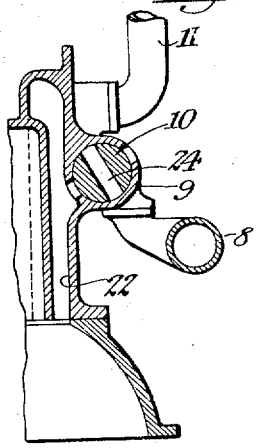
Figure 6:
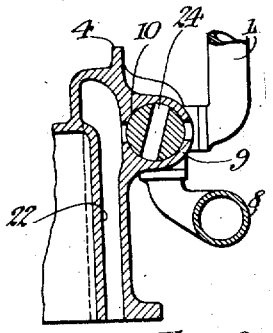
Figure 3:
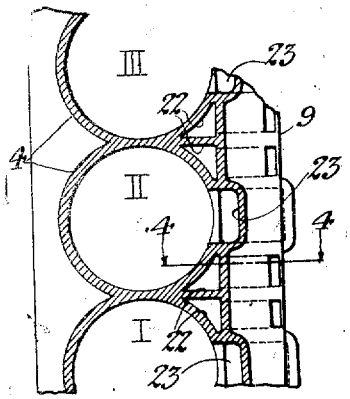
Figure 5:
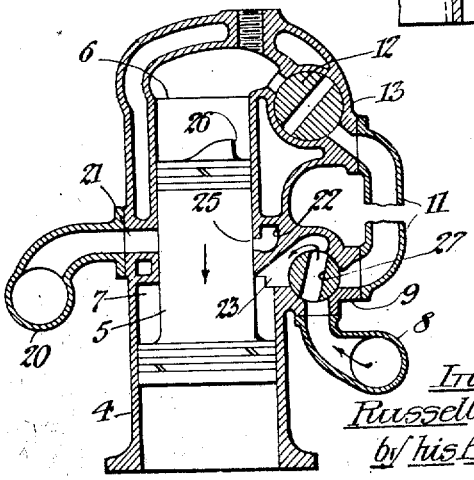

In said annexed drawings:—Figure 1 is an elevation of the valve side of a four-cylinder vertical engine embodying the present improved features of construction, a portion of the valve casing being broken away to reveal the interior construction; Fig. 2 is a vertical cross-section of one of the cylinders of said engine, as indicated by the line 2—2, Fig. 1; Fig. 3 is a horizontal sectional view through several cylinders of said engine taken in the plane indicated by the lines 3—3, Figs. 1 and 2; Fig. 4 is a vertical section of a portion of one engine cylinder as indicated by the line 4—4, Fig. 3; Figs. 5 and 6 are sectional views corresponding to Figs. 2 and 4, respectively, but showing a modified construction of the engine in which the valves function somewhat differently, as will be hereinafter explained; Fig. 7 is a sectional view likewise corresponding to that of Fig. 2, but illustrating still another modification in the construction and mode of operation of the valves and Fig. 8 is a detail of the section of Fig. 7, showing the parts in a different operative relation.

As indicated, the engine chosen for the purpose of illustration is of the four-cylinder vertical type, but three or any greater number of cylinders may be used. In the drawings the cylinders are numbered for convenience of reference by Roman numerals, the crank positions of cylinders II., III., and IV. being shown in Fig. 2 in dotted outline, although the cylinder through which the section of said figure is actually taken is cylinder I. On this same Fig. 2, the timing of the various events of the cycle are also shown in conventional fashion in order to render the operation of the engine more easily understood.

The crank case 1 of my improved engine is shown as of the usual two-cycle compression-type of crank case construction, that is the crank 2 for each cylinder operates in an individual closed crank compartment, the partitions 3 between the compartments being indicated in dotted outline in Fig. 1. Mounted on such crank case are the cylinders 4 which have bores of two diameters as shown in Figs. 2, 5 and 7. In each such cylinder is reciprocably held the corresponding piston 5 likewise of two diameters, whereby, in addition to the combustion chamber 6 in the head of the cylinder, there is formed an annular pump chamber 7 between the enlarged lower end of the piston and the shoulder that forms the line of demarcation between the two bores of the cylinder.

Extending longitudinally of the cylinders along the valve side of the engine is the intake header or manifold 8 through which the combustible mixture is supplied from a carbureter or equivalent source (not shown), and connected with said header is a similarly disposed valve case 9 in which is mounted a composite rotary valve 10 whereby the connection between said header and the annular pumping chambers 7 of the several cylinders is controlled. The transfer of the combustible mixture from said pumping chambers to the appropriate combustion chambers occurs through transfer pipes or passages 11 which will be variously arranged depending upon the number of cylinders in the engine, as will be readily understood. The control of such transferring of the charge from the several pumping chambers to the appropriate combusion chambers is had by means of a second composite rotary valve 12 in a suitable casing 13 disposed longitudinally of the cylinders alongside their upper ends or heads, the aforesaid transfer ducts discharging into the extreme upper ends of the combustion chambers. These rotary valves may be driven by any suitable mechanism from the crank shaft 14 of the engine, a vertical spindle 15 having gear connection with said shaft and geared in turn by suitable worm gearing 16 and 17 to the forward ends of the respective rotary valves being the means illustrated. It will be understood, of course, that the aforesaid gearing connections will be such as to give a proper timing of the valves, depending upon the character and disposition of the ports or openings 18 and 19 therein through which communication with the chambers of the engine cylinders is controlled. As shown, both rotary valves are of the central slot type and are designed to be operated at half crank-shaft speed, but it is not intended to limit the construction to this specific form, as rotary valves giving the same timing may be readily designed to operate at different speeds, and such valves may be made of the notch type instead of the slot type illustrated. Moreover, for convenience each of said rotary valves is illustrated as being made in one piece extending alongside of all of the cylinders parallel to the crank shaft. Should it be found desirable for manufacturing, or other reasons, to divide either or both of the valves into shorter sections, each suitably driven and controlling one or more cylinders, this will be understood as comprehended within the disclosure, the sequence of operations during the working of the engine being the features to which attention is here directed.

The exhaust header or manifold 20 extends longitudinally of the engine cylinders on the opposite side from that along which the valves 10 and 12 are disposed, and is connected with the extreme lower portion of each of the combustion chambers of said cylinders through ports 21, which are controlled by the piston-portions of smaller diameter, as the pistons reciprocate in the cylinders.

Not only does the rotary valve 10 in the lower casing 9 on the valve side of the engine control the admission of the combustible mixture to the annular pumping chambers of the several cylinders through ports 18, but said valve also controls the admission of air to the crank cases of the cylinders, passages or ducts 22 being formed in the cylinders to this end on each side of the combustible mixture passage 23, and the valve being provided with corresponding ports 24 whereby such passages may be alternately opened and closed to the admission of atmospheric air. The aforesaid passages 22, as shown in Figs. 2 and 3, extend upwardly within the cylinder wall to a port 25 substantially opposite the exhaust port 21 that communicates with the exhaust manifold 20, as just described. The upper end of the piston, when the latter reaches the lowermost point of its stroke, just clears these ports 21 and 25, such piston end being provided with a deflecting surface 26 whereby the air which is then admitted into such combustion chamber is directed upwardly and so obliged to sweep out or scavenge the entire combustion chamber, before it reaches the outlet opening 21 into the exhaust manifold.

Having thus described with sufficient particularity, it is believed, the structural features involved, the mode of operation of my improved engine may now be considered.

Taking cylinder I., which, as previously explained, is the cylinder through which the section for Fig. 2 is taken, the position of the parts there represented is based on the assumption that a charge has just been fired in the combustion chamber 6 of such cylinder, so that the piston 5 is being driven downwardly in the performance of useful work on the crank shaft. At the same time, said piston will compress a charge of air in the closed crank-case chamber, the port 24 of the rotary valve 10, through which the air was admitted into the crank case on the preceding up-stroke of the piston, being now closed as shown in Fig. 4, and the port 25 from the air-passage 22 into the combustion chamber being still closed by the piston. The downward movement of the piston also serves to suck into the annular pump chamber 7 a fresh charge of combustible mixture from the inlet header 8, the port 18 in the valve 10 being open, as shown in Fig. 2. As the piston nears the bottom of its stroke, it leaves the top of the exhaust port 21 uncovered so that the pressure in the combustion chamber rapidly falls. Immediately thereafter the air port 25 is uncovered, as the piston reaches the extreme bottom of the stroke. This allows the air which has been compressed during such down-stroke in the crank-case chamber to pass through the ducts 22 to the combustion chamber, which it thoroughly scavenges of burnt gases, at the same time materially cooling said chamber and leaving it full of fresh air. The direction of movement of the piston is now reversed, thereby successively closing the air port 25 and the exhaust port 21. At, or slightly before, the time such air port is closed, the port 19 in valve 12 at the head of the cylinder opens to admit into the upper portion of the combustion chamber at the side opposite the exhaust port a new charge of combustible mixture, this charge being derived from the pump chamber 7 of the cylinder next advanced in the direction of rotation. With the crank shaft arrangement shown this is cylinder II., which at the time in question will be approximately half-way on the upstroke, so as to have developed a low charging pressure in its pump chamber. This incoming fresh charge in cylinder I. under consideration drives before it, and out of the still partly open exhaust port 21, a portion of the air with which the combustion chamber has been filled, the amount of air remaining depending upon the transfer pressure and volume of the incoming charge. As soon as the piston, by its upward movement, has closed the exhaust port 21, compression of the charge in the combustion chamber proceeds simultaneously with the compression of the charge in the pump chamber of cylinder II., from which such charge is being transferred, and this joint compression continues until the piston of said cylinder II. begins its downward stroke. At this point the valve 12 is designed to be rotated to close connection between the combustion chamber of cylinder I. and such pump chamber of cylinder II., leaving the compression in cylinder I. to be completed by the remaining upward movement of the piston therein until the time for firing of the charge is reached. This upstroke of the piston in cylinder I. also performs two other functions in addition to compressing the charge in the combustion chamber of said cylinder, viz., air is being sucked into the crank case of said cylinder through the ducts 22 and the port 24 in valve 10, which latter is in its open position; and a charge of combustible mixture is being transferred from the pump chamber 7 of such cylinder I. to the combustion chamber of the cylinder next behind in order of rotation, or in the case in hand to cylinder III. It will thus be seen that each piston compresses below it, its own air for scavenging, and simultaneously acts as a pump to deliver a charge of combustible mixture at low pressure to the top of the combustion chamber of the cylinder following it in the order of rotation. When the mixture supply is throttled to produce slow speed, or low power, the volume of the charge drawn into the pump chamber of the cylinder is relatively small. The transfer of such charge from any one pump chamber to the appropriate combustion chamber will accordingly displace a correspondingly smaller amount of the residual scavenging air in said chamber. Owing, however, to the relatively low pressure, under which the charge is thus transferred to the combustion chamber, the air is not disturbed but forms a stratum in the bottom of the chamber as is desirable in order to obtain maximum efficiency and insure the proper firing of the charge. It will be noted that when the valve first opens and the transfer of the charge begins, the piston in the pump chamber of the cylinder, from which the charge is being transferred, will have developed a pressure of only a few pounds, so that the transfer is accomplished mainly by displacement due to the further movement of said piston. This valve furthermore can remain open until the piston within the first cylinder has more than half completed its upward movement. It will thus be seen that I am able by means of the foregoing construction to greatly increase the length of the admission period and thereby secure a correspondingly low gas velocity. Valve 10, by means of its air and gas ports, alternately admits air to the crank cases, and combustible mixture to the pump chambers of the various cylinders as previously explained; but such valve does not in any way control the time of transfer of the mixture to the combustion chambers, nor does it control the entrance of the scavenging air into such combustion chambers, the former function being performed entirely by the valve at the head of the cylinder, and the latter by the direct action of the piston in uncovering the port 25 at the bottom of its stroke.

The modification in construction shown in Figs. 5 and 6 relates to rotary valve 10 whereby it is made to additionally function as a check valve to the transfer passages or ducts 11 leading from the various pump chambers to the heads of the cylinders. Thus in the position illustrated in Fig. 5, in which the piston 5 is assumed to be moving downwardly just as in Fig. 2, it will be observed that the port 27 in said valve, at the same time that it opens communication between the intake manifold 8 and the pump chamber 7 of the cylinder, closes communication between said chamber and the transfer passage 11. This closure of the latter occurs before the pressure of the volume of gas confined in such passage has been relieved. Accordingly, there is no work lost in re-compressing this portion of the charge as would otherwise be the case where such portion flows back into the pump chamber, as for example in the construction first described. The arrangement and operation of the ports 24 in said valve 10, which control the air supply to the crank case chambers are substantially the same as before, as illustrated in Fig. 6.

The remaining modification, that shown in Figs. 7 and 8, consists in combining the gas and air ports in the rotary valve 10 so that a single port 28 through such valve is all that is necessary for each cylinder. This port is arranged to register alternately with the air and gas passages 22 and 23 in the casing leading to that cylinder, so as to deliver air to the crank case, and combustible mixture to the pump chamber. The position of the piston illustrated in said Fig. 7, is the same as in Figs. 2 and 5, namely, said piston is shown on its down stroke, the pump chamber filling with the incoming charge and the crank case being closed so that the piston is compressing the air therein. The alternative position of the valve is shown in Fig. 8, which should be found self-explanatory in view of the foregoing.

In the particular form of my invention set forth in the preceding description and shown in the drawings, some of the valve functions are performed by rotary valves while others are performed by the movement of the piston, but it will be understood that while this is my present preferred construction, other forms of valves or their equivalent means may be employed.

It will also be understood that while I prefer to use the annular piston chamber as a fuel charge pump and the space beneath the piston in the crank case as a scavenging air pump, the two functions may be interchanged so long as the conduits connecting them to the combustion chambers are correspondingly changed to allow them to function at the proper time.

My invention consists, therefore, not only in the preferred construction shown, but includes various other forms and arrangements of parts whereby the same cycle of operations and advantages are secured.

I therefore particularly point out and distinctly claim as my invention:

1. A two-cycle internal combustion engine having three or more units each including a combustion chamber, a fuel pumping chamber, an air compressing and pumping chamber and a reciprocatory piston member having operating parts coöperating with each chamber, said combustion chamber having an exhaust port and said pumping chambers having inlet ports, means to connect the air pumping and compression chamber of each unit with the combustion chamber of the same unit when the piston member of that unit is at the end of its power stroke and after the opening of the exhaust port from the combustion chamber, means to connect the fuel pumping chamber of each unit with the combustion chamber of a different unit, and crank shaft connections between the several piston members for imparting to each fuel pump piston part, a delivery stroke beginning not more than one-third of a crank-shaft revolution ahead of the compression stroke of the power piston part in the combustion chamber to which the charge is delivered.

2. A two-cycle internal combustion engine having three or more units, each including a combustion chamber, a fuel pumping chamber, an air compressing and pumping chamber, and a reciprocatory piston member having operating parts coöperating with each other, said combustion chamber having an exhaust port and said pumping chambers having inlet ports, means to connect the combustion chamber of each unit when the piston is at the end of its power stroke with the air compression chamber whose piston is at the end of its compression stroke, means to connect each combustion chamber with the fuel pumping chamber of a different unit, whose piston member is intermediate of the ends of its delivery stroke, and means for closing said last mentioned connection after the piston part in the combustion chamber has completed not less than one-third of its compression stroke as measured by the rotation of the crank shaft.

3. A two-cycle internal combustion engine having three or more units, each including a combustion chamber, a fuel pumping chamber, an air compressing and pumping chamber and a reciprocatory piston member having operating parts coöperating with each chamber, said combustion chamber having an exhaust port and said pumping chambers having inlet ports, passages to connect the air pumping and compression chamber of each unit with the combustion chamber of the same unit when the piston member of that unit is at the end of its power stroke and after the opening of the exhaust port from the combustion chamber, and passages to connect each fuel pumping chamber with the combustion chamber of the unit not more than one-third of a revolution later in order of crank-shaft rotation.

4. A two-cycle internal combustion engine having three or more units each including a combustion chamber, a fuel pumping chamber, an air compressing and pumping chamber and a reciprocatory piston member having operating parts coöperating with each chamber, said combustion chamber having an exhaust port and said pumping chambers having inlet ports, passages to connect the air pumping and compression chamber of each unit with the combustion chamber of the same unit when the piston member of that unit is at the end of its power stroke and after the opening of the exhaust port from the combustion chamber, passages to connect each fuel pumping chamber with the combustion chamber of the unit not more than one-third of a revolution later in order of crank-shaft rotation, and means for opening each of said last mentioned passages after the opening of the corresponding one of said first mentioned passages and closing them after the corresponding pistons have advanced on their compression strokes in the compression chambers by not less than sixty degrees of crank-shaft rotation.

5. An internal combustion engine having three or more cylinders of the two-diameter type and corresponding two-diameter pistons reciprocable therein, each of said pistons forming in connection with its cylinder and closed compartment beneath it a combustion chamber, a charge pump chamber, and a scavenging air compression chamber; an exhaust port and an air port in each combustion chamber arranged to be opened as the piston approaches the end of its power stroke, an individual conduit connecting each air compression chamber with the air port of a combustion chamber which makes its power stroke in time with the compression stroke in said air compression chamber, a charge inlet port in each combustion chamber, and an individual conduit connecting each fuel pump chamber with the inlet port of a combustion chamber which has its compression stroke timed not more than one-third of a revolution later than the compression stroke in said pump chamber, the arrangement being such that the exhaust, air, and inlet ports are opened in the order named and the air, exhaust and inlet ports are closed in the order last named.

6. An internal combustion engine having three or more units, each including a cylinder of the two-diameter type, a corresponding two-diameter piston reciprocable therein; and a crank case section, said parts together forming for each unit a combustion chamber, an annular charge pump chamber, and a scavenging air compression chamber, said combustion chamber having an exhaust port and an air port arranged to be opened as the piston approaches the end of its power stroke, an individual conduit connecting each air compression chamber with the air port of a combustion chamber of the same unit, a charge inlet port in each combustion chamber, and an individual conduit connecting each fuel pump chamber with the charge inlet port of a combustion chamber which has its compression stroke timed not more than one-third of a revolution later than the compression stroke in said pump chamber, the arrangement being such that the exhaust, air and inlet ports are opened in the order named, and the air, exhaust and inlet ports are closed in the order last named.

7. In an internal combustion engine, the combination of three or more cylinders and pistons reciprocable therein, each of said cylinders forming in connection with its piston a fuel pumping chamber and a combustion chamber, the latter being provided with an exhaust port and an air-inlet port controlled by the movement of the piston; a crank-case forming separate air-compression chambers corresponding with said cylinders, a conduit connecting each compression chamber with the air-inlet port in the corresponding combustion chamber, a conduit connecting each pumping chamber with the combustion chamber of the cylinder fired not more than one-third of a revolution later in order of crank-shaft rotation; valve mechanism adapted to control the last mentioned conduit and permit the transfer of fuel from the pumping chambers to the connected combustion chambers during at least one-third of the compression stroke in said combustion chambers.

8. In an internal combustion engine, the combination of three or more cylinders and pistons reciprocable therein, each of said cylinders forming in connection with its piston an annular fuel pumping chamber and a combustion chamber, the latter being provided with an exhaust port and an air-inlet port arranged to be successively opened by the piston in the order named in the course of said piston's downward movement; a crank-case forming separate air-compression chambers corresponding with said cylinders, each compression chamber being connected with the air-inlet port in the corresponding combustion chamber and each pumping chamber being connected with the combustion chamber of the cylinder following not more than one-third of a revolution later in order of crank-shaft rotation; valve mechanism controlling the admission of air to the compression chambers, the admission of fuel to the pumping chambers and the transfer of fuel from the pumping chambers to the connected combustion chambers.

9. In an internal combustion engine, the combination of three or more cylinders and pistons reciprocable therein, each of said cylinders forming in connection with its piston an annular fuel pumping chamber and a combustion chamber, the latter being provided with an exhaust port and an air inlet port arranged to be successively opened by the piston in the order named as said piston approaches the lower limit of its movement; a divided crank-case forming air-compression chambers corresponding with said cylinders, each compression chamber being connected with the air-inlet port in the corresponding combustion chamber and each pumping chamber being connected with the upper end of the combustion chamber of the cylinder fired not more than one-third of a revolution later in order of crank-shaft rotation; valve mechanism controlling the admission of air to the compression chambers, the admission of fuel to the pumping chambers and the transfer of fuel from the pumping chambers to the connected combustion chambers.

10. In an internal combustion engine, the combination of three or more cylinders and pistons reciprocable therein, each of said cylinders forming in connection with its piston an annular fuel pumping chamber and a combustion chamber, the latter being provided in its opposite side walls with an exhaust port and an air-inlet port arranged to be successively opened by the piston in the order named as said piston approaches the lower limit of its movement; a divided crank-case forming air-compression chambers corresponding with said cylinders, each compression chamber being connected with the air-inlet port in the corresponding combustion chamber and each pumping chamber being connected with the upper end of the combustion chamber of the cylinder fired not more than one-third of a revolution later in order of crank-shaft rotation; means controlling the admission of air to the compression chambers and of fuel to the pumping chambers; and separate means, operable independently of said first-named controlling means, adapted to control the transfer of fuel from the pumping chambers to the connected combustion chambers.

11. In an internal combustion engine, the combination of three or more cylinders and pistons reciprocable therein, each of said cylinders forming in connection with its piston a fuel pumping chamber and a combustion chamber, the latter being provided with an exhaust port and an air-inlet port controlled by the movement of the piston; a divided crank-case forming air-compression chambers corresponding with said cylinders, each compression chamber being connected with the air-inlet port in the corresponding combustion chamber and each pumping chamber being connected with the combustion chamber of the cylinder fired not more than one-third of a revolution later in order of crank-shaft rotation; a rotary valve controlling the admission of air to the compression chambers and of fuel to the pumping cylinders; and a separate rotary valve controlling the transfer of fuel from the pumping chambers to the connected combustion chambers.

12. In an internal combustion engine, the combination of three or more cylinders and pistons reciprocable therein, each of said cylinders forming in connection with its piston a fuel pumping chamber and a combustion chamber, the latter being provided with an exhaust port and an air-inlet port controlled by the movement of the piston; a divided crank-case forming air compression chambers corresponding with said cylinders, each compression chamber being connected with the air-inlet port in the corresponding combustion chamber and each pumping chamber being connected with the combustion chamber of the cylinder fired not more than one-third of a revolution later in order of crank-shaft rotation; a rotary valve controlling the admission of air to the compression chambers and of fuel to the pumping chambers, said valve being adapted to close communication between the pumping chambers and their connections with the combustion chambers; and independent means controlling the transfer of fuel through such connections from the pumping to the combustion chambers.

13. In an internal combustion engine, the combination of three or more cylinders and pistons reciprocable therein, each of said cylinders forming in connection with its piston a fuel-pumping chamber and a combustion chamber, the latter being provided with an exhaust port and an air-inlet port controlled by the movement of the piston; a divided crank-case forming air-compression chambers corresponding with said cylinders, each compression chamber being connected with the air-inlet port in the corresponding combustion chamber; a fuel-supply manifold extending alongside said cylinders, each pumping chamber being connected therewith; a rotary valve disposed parallel with said manifold and controlling the connections between the same and the pumping chambers; a series of ducts connecting said pumping chambers respectively with the upper end of the combustion chamber of the cylinder fired not more than one-third of a revolution later in order of crank-shaft rotation; and a second rotary valve extending along the upper ends of the cylinders and controlling communication between said ducts and the combustion chambers.

14. In an internal combustion engine, the combination of three or more cylinders and pistons reciprocable therein, each of said cylinders forming in connection with its piston a fuel-pumping chamber and a combustion chamber, the latter being provided with an exhaust port and an air-inlet port controlled by the movement of the piston, a divided crank-case forming air-compression chambers corresponding with said cylinders, each compression chamber being connected with the air-inlet port in the corresponding combustion chamber; a fuel-supply manifold extending alongside said cylinders, each pumping chamber being connected therewith; a rotary valve disposed parallel with said manifold and controlling the connections between the same and the pumping chambers; a series of ducts connecting said pumping chambers respectively with the upper end of the combustion chamber of the cylinder fired not more than one-third of a revolution later in order of crank shaft rotation; and a second rotary valve extending along the upper ends of the cylinders and controlling communication between said ducts and the combustion chambers, said first rotary valve being arranged to close communication between said ducts and pumping chambers when said chambers are opened to the admission of fuel from said manifold.

15. In an internal combustion engine, the combination of three or more cylinders and pistons reciprocable therein, each of said cylinders forming in connection with its piston, a fuel-pumping chamber and a combustion chamber, the latter being provided with an exhaust port and an air-inlet port controlled by the movement of the piston; a divided crank-case forming air-compression chambers corresponding with said cylinders, each compression chamber being connected with the air-inlet port in the corresponding combustion chamber; a fuel-supply manifold extending alongside said cylinders, each pumping chamber being connected therewith; a rotary valve disposed parallel with said manifold and controlling the connections between the same and the pumping chambers, the same valve also controlling the admission of air to the compression chambers; a series of ducts connecting said pumping chambers respectively with the upper end of the combustion chamber of the cylinder fired not more than one-third of a revolution later in order of crank-shaft rotation; and a second rotary valve extending along the upper ends of the cylinders and controlling communication between said ducts and the combustion chambers.

Signed at New York city, in the county of New York, and State of New York, this 27th day of March, 1916.

RUSSELL T. KINGSFORD.